United States Patent [19]

Foley

[11] 4,249,864
[45] Feb. 10, 1981

[54] CENTRIFUGAL PUMP SYSTEM FOR WATER DESALINIZATION

[75] Inventor: Norman L. Foley, Modbury North, Australia

[73] Assignee: Auscoteng Pty. Ltd., Rose Park, Australia

[21] Appl. No.: 916,153

[22] Filed: Jun. 19, 1978

Related U.S. Application Data

[63] Continuation of Ser. No. 792,677, May 2, 1977, abandoned, which is a continuation of Ser. No. 597,428, Jul. 21, 1975, abandoned.

[51] Int. Cl.³ .............................................. F04B 23/14
[52] U.S. Cl. ........................................ 417/77; 417/80; 417/89
[58] Field of Search ................... 417/76, 77, 79, 80, 417/87, 89, 151; 415/53; 202/205

[56] References Cited

U.S. PATENT DOCUMENTS

| 41,158 | 1/1864 | Lansdell | 417/151 |
|---|---|---|---|
| 118,472 | 8/1871 | Munzinger | 417/77 |
| 1,046,304 | 12/1912 | Josse et al. | 417/174 X |
| 1,855,061 | 4/1932 | Lauchenauer | 417/80 |
| 2,061,013 | 11/1936 | Wade | 417/77 |
| 2,162,074 | 6/1939 | Everson | 417/79 |
| 2,452,421 | 10/1948 | Ames | 417/77 |
| 2,702,664 | 2/1955 | Pienaar | 417/77 |
| 3,553,084 | 1/1971 | Creskoff | 202/205 X |
| 3,558,436 | 1/1971 | Foley et al. | 202/205 X |
| 3,577,320 | 5/1971 | Randell | 202/205 X |
| 3,725,206 | 4/1973 | Foley | 202/205 |
| 3,730,646 | 5/1973 | Affri et al. | 417/77 |
| 3,895,885 | 7/1975 | Liberg | 417/77 |

FOREIGN PATENT DOCUMENTS

| 765446 | 4/1936 | France | 417/151 |
|---|---|---|---|
| 382592 | 10/1932 | United Kingdom | 417/76 |

*Primary Examiner*—Carlton R. Croyle
*Assistant Examiner*—Edward Look
*Attorney, Agent, or Firm*—Wm. T. Wofford

[57] ABSTRACT

A centrifugal pump for producing a vacuum, the pump recirculating fluid through a vacuum chamber into which a vacuum line opens, the flow of water across the chamber carrying air or gas therewith to produce the required vacuum.

2 Claims, 1 Drawing Figure

Each pumping system according to this invention therefore comprises a pump which is driven by any suitable means and the outlet of which is associated with a vessel through which circulation is to take place, the inlet to the pump being also connected to this vessel to give an endless circulatory system, but at the inlet to the pump is the vacuum chamber which is so arranged that liquid gravitating to the pump flows into this vacuum chamber to then circulate with the liquid to the separation chamber.

CENTRIFUGAL PUMP SYSTEM FOR WATER DESALINIZATION

This is a continuation of application Ser. No. 792,677, filed May 2, 1977, now abandoned, which is a continuation of Ser. No. 597,428, filed July 21, 1975, now abandoned.

This invention relates to a centrifugal pump system for use in the evaporative distillation of liquids under low pressures.

BACKGROUND OF THE INVENTION

In water desalinisation equipment using the principle of evaporation to remove salt and other minerals, it is customary to have an evaporator in which conditions are so adjusted that steam or vapour is formed which is then taken to a heat exchanger whereby the steam is condensed to provide the distilled water.

In such systems it is customary to feed brine into the evaporator from a constant level supply and to then so adjust conditions between the evaporator and the heat exchanger that the necessary transfer of the vapour will take place, such a method including for instance the use of a pump which moves the vapour to the heat exchanger.

Among these systems embodying this general principle are those in which refrigeration equipment is used to evaporate water at ambient or raised temperature, the evaporator of the refrigeration system being connected to the condenser through pump means, the condenser ensuring that the steam or vapour is brought back to its liquid phase to form the distillate.

It has also been proposed by us in such a system to use what we term a "blow-down" pump which draws off excess water from the evaporator when the salinity of that water reaches a certain value, this then ensuring that the products left behind in the evaporation process are washed out of the system so that the process can be a continuous one.

One of the problems encountered in apparatus of this type is to be able to maintain correct movement of the vapour or steam, and also to maintain the necessary pressure differentials in the system because obviously in the evaporator a lowered pressure must exist to ensure ready boiling of the liquid while in the condenser it may be preferable to have a higher pressure to ensure ready condensation of the vapour.

As the pumps must be of a nature such that they can draw the necessary vacuum in the condenser, problems exist in achieving good seals in such pumps, and according to one of our earlier Patent Applications a system of water seals was used so that relatively inexpensive gear pumps could be used for the drawing of the vacuum.

The object of the present invention is to provide an improved pumping system for use in evaporative distillation plants of the general type outlined whereby the necessary seals can be readily obtained and in which in the ultimate form it is unnecessary to use expensive condensers and evaporators.

SUMMARY OF THE INVENTION

The improved pumping system according to our invention comprises a recirculatory system for the liquid in either the evaporator and the condenser but such circulatory systems include a vacuum chamber at the pump inlet which is so arranged that it can transport and condense.

DESCRIPTION OF THE DRAWINGS

The FIG. 1 shows diagrammatically a pump according to the invention and flow chart details of the pumping system as part of a liquid distillation plant.

DESCRIPTION OF THE PREFERRED EMBODIMENT

Figure 1:
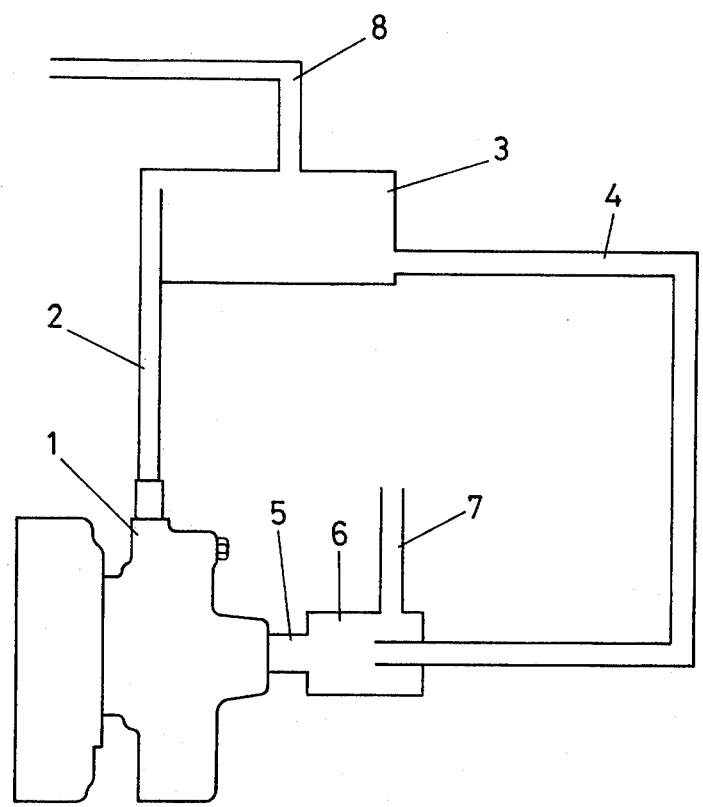

Referring to FIG. 1 drawing, the pumping circuit comprises a conventional centrifugal pump 1, the outlet pipe 2 of the pump 1 terminating near the upper end of a liquid trap or separation chamber 3, the top of the separation chamber 3 being connected to an outlet pipe 8. From the bottom of the separation chamber 3 a recirculation pipe 4 is provided which terminates adjacent to the inlet 5 of the pump 1. Surrounding the end of the recirculating pipe 4 and the end of the inlet pipe 5 is a vacuum chamber 6 into which enters the air or gas inlet pipe 7 and which would be piped to either the condenser or evaporator (not shown in FIG. 1) when used with a distillation plant.

The outlet end of the recirculation pipe 4 is disposed spaced from and adjacent to the inlet 5 of the pump with the recirculation pipe 4 being of smaller diameter than the inlet to the pump 5. By suitably positioning the end of the recirculation pipe 4 relative to the inlet 5 to the pump 1, during operation of the pump 1, a greatly reduced pressure is formed in the vacuum chamber 6 and pipe 7 by the free jet of water issuing across the space between the two pipes due to the free jet of water carrying, with it any fluid contacting the jet in the chamber. The fluid thus carried is discharged by the pump 1 into the separation chamber 3 from whence it issues through the outlet pipe 8.

Throughout the specification the term "fluid" is intended to include fluids such as air, gas, steam and liquids such as water.

As a large volume of liquid is being recirculated compared with the volume of air being carried, the recirculated liquid acts as a liquid seal in the centrifugal pump and is thus able to maintain a high vacuum to the vacuum chamber so long as the pump is operating.

The action of the vacuum chamber 6 is to create a greatly reduced pressure by the commingling of fluids in physical contact with the free jet issuing between the two pipes which terminate in the vacuum chamber. The integrity of this jet is maintained at all times while transitting the open gap.

The pump thus produces a high vacuum in the vacuum chamber by removing the jet liquid as quickly as it strikes the pump impeller. Thus when any liquid passes through the air or gas inlet pipe 7 to the vacuum chamber this liquid collects in the bottom of the vacuum chamber and when the level rises to contact the jet it also commingles in the jet to be carried into the pump and discharged into the separation chamber, the excess of liquid in the separation chamber being discharged from the top of the separation chamber through the outlet pipe.

It has been found that in one embodiment of the vacuum chamber satisfactory operation is obtained with the outlet of the recirculation pipe being one half inch in diameter and spaced one inch from the inlet of the pump, the inlet of the pump being one inch in diameter. These figures are not to be taken as limiting but the sizes and spacing may be varied depending on the size of pump, flow of water, etc., to ensure that the desired reduced pressure is obtained.

As a typical example of a distillation system to which the invention can be applied, an evaporation chamber in which brine is circulated has a reduced pressure in it through a conduit to the inlet of the vacuum chamber and conditions so arranged that evaporation of the liquid takes place in this evaporation chamber.

The steam or vapour is drawn into the vacuum chamber to mingle with the liquid which is circulated by the pump, so that the vapour is condensed and carried over into the separation chamber to mingle with the distillate being circulated through the pumping circuit. A distillation system such as that above-mentioned is shown and described by my copending Continuation-In-Part application Ser. No. 781,125, filed Mar. 25, 1977, which is incorporated herein by reference.

It will be realised that the actual condensation can take place in the vacuum chamber because of the design of the chamber and the conditions involved, and to fully understand this it should be appreciated that the vacuum chamber, which is positioned at the intake to the pump, has a dimension such that liquid circulated by the pumping system issues from the inlet pipe into this chamber at a rate sufficient for a solid liquid jet to carry into the pump inlet and that this solid jet at any instant represents a cold condensing surface. Steam entering the vacuum chamber, either by pressure from its evaporating source or by pump suction effect, will condense on and into the surface of the water column within the vacuum chamber.

At all succeeding instances a new surface area is presented and hence more steam will condense, and the system is therefore designed so that the latent and sensible heats of the steam entering the water circulating load, is removed by heat exchange in the separation chamber.

Research has shown that 120,000 cubic feet of low saturation temperature steam (96° F.) can easily be handled by such a pumping system while the water which is the product of distillation and also non-condensable gases are handled without any interruption to the requirement of maintaining the desired high vacuum in the evaporator of the desalinisation plant.

It should be stated that when using a centrifugal pump all the above continuously takes place and the only limiting feature is that sufficient water must be circulating to actually carry the amount of steam heat which is accepted at the vacuum chamber and carry it to the vessel to which the pump is connected.

Referring to design parameters, it can be stated that the greater the diameter of the water column entering the vacuum chamber in relation to the pump suction pipe, but which must not equal or be larger than the pump suction pipe, then the pump discharge pressure reduces and hence less power is required to operate the pump.

Since the pump discharge is in fact assisting to feed the pump suction, smaller motors are sufficient for available given water flows.

It should be realised that with the system envisaged, high vacuum conditions can be achieved due to this system extracting all the air and non-condensables, and since the system can and does condense steam, then with only the pump system running, that is no other heat being applied to cause evaporation, the vacuum is so high that the heat contained in the body of water in the evaporator is used to generate steam.

This steam is then drawn to the vacuum chamber and condensed. The evaporator water is then cooled but again steam is generated with any heat left in the water and this is a continuous process and in warm environments ambient heat from surrounding air is drawn into the evaporating water. Very high vacuums can be created in low temperature water in the pumping circuit.

It can also be mentioned that the continual flow of steam to the vacuum chamber scrubs all air and gases in its path to the vacuum chamber.

With the system as described, the unit can therefore have a vessel in which the evaporation takes place, and this vessel can have a supply of water to it to maintain a particular level in the vessel, but concentrated brine can flow from this vessel into the vacuum chamber of a blow-down pump which circulates the brine through a cooled separation chamber, a bleed takes place from this circulatory system to ensure that the concentrated brine is constantly flushed from the evaporation chamber to thereby discharge the minerals and salts which would otherwise be deposited in the evaporation chamber.

The steam or vapour from the evaporation chamber flows into the vacuum chamber of the distillate pump, which as previously described also assists in maintaining the vacuum in the evaporation chamber. The distillate pump circulates distillate through the cooled distillate separation chamber and recirculation pipe to the vacuum chamber so that condensation of the steam or vapour takes place in contact with the free jet and the resultant liquid then becomes part of the circulating fluid in the distillate separation chamber, the overflow liquid being drawn off from the distillate separation chamber during the operation of the process.

The distillate and blow-down pumps are provided with non-return valves so that when the pumps stop, the vacuum will be maintained in the system.

The separation chamber through which the blow-down pump circulates the brine can have in it a means through which cooling water can flow, which can be bled off from the supply to the float operated feed tank, and flow control orifice being provided in the brine flow to the vacuum chamber.

As stated earlier, the system can operate without a referigeration system but if that system is used, then the steam evaporator will have the condenser of the refrigerant unit positioned in the evaporator to act as the heat transfer means, while the evaporator of the refrigeration system will be positioned within the distillate condenser previously referred to.

I claim:
1. A continuous vacuum pumping system comprising:
   a. a centrifugal pump having an outlet and an inlet;
   b. a separation chamber disposed above the level of said inlet;
   c. an outlet conduit communicating between said pump outlet and said separation chamber;

d. a vacuum chamber having an inlet;
e. a recirculation conduit communicating between said separation chamber and said vacuum chamber and protruding into the vacuum chamber;
f. an inlet conduit communicating between said pump inlet and said vacuum chamber, with the protruding portion of said recirculation conduit being coaxial with and axially spaced from said inlet conduit, and with the interior sidewalls of said pump inlet conduit and said protruding portion being parallel to their mutual central axis;
g. whereby, a stream of liquid passing from said recirculation conduit to said inlet conduit and across a portion of said vacuum chamber will carry with it fluid passed into said vacuum chamber via said chamber inlet.

2. A continuous vacuum pumping system defined in claim 1 wherein said outlet conduit enters said separation chamber at the nearest point to the pump outlet and terminates adjacent the top thereof; said separation chamber is provided an outlet at the top thereof; said recirculation conduit is disposed adjacent the bottom thereof; whereby fluid transported with the recirculated liquid is exhausted via said top outlet.

* * * * *